United States Patent
Yu et al.

(10) Patent No.: US 11,203,686 B2
(45) Date of Patent: Dec. 21, 2021

(54) POLYMER WAX POWDER HAVING A SELF-REPAIRING FUNCTION AND PREPARATION METHOD THEREOF

(71) Applicant: NANJING TIANSHI NEW MATERIAL TECHNOLOGIES CO., LTD, Jiangsu (CN)

(72) Inventors: Haikuo Yu, Jiangsu (CN); Hua Ren, Jiangsu (CN); Tingting Gu, Jiangsu (CN); Xiangkang Meng, Jiangsu (CN)

(73) Assignee: NANJING TIANSHI NEW MATERIAL TECHNOLOGIES CO., LTD, Jiangsu (CN)

( * ) Notice: Subject to any disclaimer, the term of this patent is extended or adjusted under 35 U.S.C. 154(b) by 0 days.

(21) Appl. No.: 17/044,060

(22) PCT Filed: Sep. 7, 2018

(86) PCT No.: PCT/CN2018/104570
§ 371 (c)(1),
(2) Date: Sep. 30, 2020

(87) PCT Pub. No.: WO2020/047827
PCT Pub. Date: Mar. 12, 2020

(65) Prior Publication Data
US 2021/0054208 A1 Feb. 25, 2021

(51) Int. Cl.
*C08L 91/06* (2006.01)
*C09D 163/00* (2006.01)
*C09D 167/02* (2006.01)

(52) U.S. Cl.
CPC ............ *C08L 91/06* (2013.01); *C09D 163/00* (2013.01); *C09D 167/02* (2013.01); *C08L 2205/03* (2013.01)

(58) Field of Classification Search
CPC ...................................................... C08L 91/06
See application file for complete search history.

(56) References Cited

U.S. PATENT DOCUMENTS 6,881,769 B1 * 4/2005 Grob .................... C09D 5/032
523/457

FOREIGN PATENT DOCUMENTS

| CN | 102020776 A | 4/2011 |
| CN | 102617866 A | 8/2012 |
| CN | 103160185 A | 6/2013 |
| CN | 105542660 A | 5/2016 |

* cited by examiner

*Primary Examiner* — Arrie L Reuther
(74) *Attorney, Agent, or Firm* — Tarolli, Sundheim, Covell & Tummino LLP

(57) ABSTRACT

A polymer wax powder having a self-repairing function and a preparation method thereof, wherein the polymer wax powder is prepared from the following components in parts by weight: 55-75 parts of a polyethylene wax, 1-20 parts of an allyl bisphenol A diglycidyl ether epoxy resin, 0.5-2 parts of a hydroxyalkylamide, 0.5-5 parts of a silane coupling agent, 5-25 parts of a carboxyl-terminated saturated polyester, and 0.5-5 parts of an accelerator. The preparation method thereof includes steps of mixing components, melt extruding, micronizing and cross-linking by electron irradiation. A composite polymer wax micropowder with an average particle size of 1 μm-70 μm could be prepared by the above method; such wax micropowder may be used as a self-repairing functional additive for a polyester type or epoxy polyester type powder coating, thereby improving the surface hardness and stain resistance of the powder coating, and imparting a self-repairing function to the coating material.

6 Claims, No Drawings

POLYMER WAX POWDER HAVING A SELF-REPAIRING FUNCTION AND PREPARATION METHOD THEREOF

RELATED APPLICATIONS

The present invention is a U.S. National Stage under 35 USC 371 patent application, claiming priority to Serial No. PCT/CN2018/104570, filed on 7 Sep. 2018, the entirety of which is incorporated herein by reference.

TECHNICAL FIELD

The present disclosure relates to a field of polymer, and in particular to a polymer wax powder having a self-repairing function and a preparation method thereof.

BACKGROUND

In recent years, low molecular weight polyethylene wax is widely used in coating, ink, leather, papermaking and other industries due to its excellent characteristics of cold resistance, heat resistance, wear resistance and the like, imparting excellent anti-friction and stain resistance to the products of the above industries. In the last ten years, by partial introduction and independent development, China has broken through the key technologies of special polyethylene wax materials, processes and equipment, and the quality of polyethylene wax materials has gradually reached the level of foreign advanced products.

Polyethylene wax powder may be added to a powder coating as a functional additive to improve the hydrophobicity and anti-friction of the surface of the coating, and to make the appearance decoration a good state for a long time. However, the coating material may rub against hard objects during using, resulting in scratches, which will have a negative effect on the decorative properties of the coating. In recent years, from the perspective of functionalization of coating materials, the research turns to coating materials with a self-repairing function, and a certain number of new materials have been designed. However, for the new materials that satisfy the self-repairing function of coatings, it is often difficult to balance the adhesion, flexibility, surface hardness and other properties of the coating materials, resulting in that a large-scale application of the materials could not be realized.

SUMMARY

In order to solve the above technical problems existing in the prior polyethylene wax powder, the present disclosure provides a polymer wax powder having a self-repairing function and a preparation method thereof.

The idea of the present disclosure to solve the problems in the prior art is as follows:

introducing an allyl bisphenol A diglycidyl ether epoxy resin, a hydroxyalkylamide, a silane coupling agent, a carboxyl-terminated saturated polyester, a catalytic accelerator, etc. into a polyethylene wax matrix, mixing and extruding the mixture by a screw, and micronizing the resulting extrudate by a jet mill to obtain a micron-sized powder, and then initiating the cross-linking of the polyethylene wax by an electron irradiation to graft a resin containing an olefin double bond onto the main chain of polyethylene under the conditions of a certain irradiation energy, a certain power and a certain temperature, to obtain a composite polymer wax powder with an average particle size of 1 μm-75 μm.

Based on the above idea, the polymer wax powder having a self-repairing function according to the present disclosure is prepared from the following components in parts by weight:
55-75 parts of a polyethylene wax,
1-20 parts of an allyl bisphenol A diglycidyl ether epoxy resin,
0.5-2 parts of a hydroxyalkylamide,
0.5-5 parts of a silane coupling agent,
5-25 parts of a carboxyl-terminated saturated polyester, and
0.5-5 parts of an accelerator.

The method for preparing the above polymer wax powder having a self-repairing function comprises the following steps:

1) mixing components mixing a polyethylene wax, an allyl bisphenol A diglycidyl ether epoxy resin, a hydroxyalkylamide, a silane coupling agent, a carboxyl-terminated saturated polyester and an accelerator in parts by weight;

2) melt extruding adding the above components into a twin screw extruder, heating the mixture to 70° C.-130° C. and extruding the same, and then cooling and tabletting the resulting extrudate, to obtain a composite wax sheet;

3) micronizing micronizing the composite wax sheet obtained in step 2) to obtain a wax micropowder with an average particle size of 1 μm-75 μm; and 4) cross-linking by an electron irradiation strengthening the micronized composite wax by an electron irradiation with a material irradiation dose of 300-1000 kGy, a device radiation energy of 1.5-5 MV, a power of 60-150 kW, and a radiation residence time of 60-1800 s, to obtain a polymer wax powder having a self-repairing function.

The allyl bisphenol A diglycidyl ether epoxy resin is 4,4'-diallylbisphenol A diglycidyl ether epoxy resin with an epoxy equivalent of 210-333 g/mol.

The silane coupling agent is at least one selected from the group consisting of allyltrimethoxysilane, allyltriethoxysilane, γ-methacryloxypropyl trimethoxysilane and vinyl triethoxy silcane.

The carboxyl-terminated saturated polyester has an acid value of 12-90 mg KOH/g.

The accelerator is at least one selected from the group consisting of nano-zinc oxide, tetraisobutyl orthotitanate and bis(pentane-2,4-dionato-O,O')zinc.

According to the present disclosure, the polyethylene wax micropowder is used as a matrix, and the thermosetting saturated polyester cross-linking network and ester bond exchange catalytic system are incorporated into the molecular chain of polyethylene. Meanwhile, the electron irradiation technology is used to initiate the molecular structure cross-linking of polyethylene, and the energy, power and time of the electron irradiation are adjusted to realize the grafting of an self-repairing group onto the main chain of polyethylene.

The polymer wax powder having a self-repairing function according to the present disclosure can be used as a self-repairing functional additive for the polyester type or epoxy polyester type powder coating. When being added into a powder coating system, the polymer wax powder having a self-repairing function according to the present disclosure can improve the surface hardness and stain resistance of the powder coating, make the water contact angle of the coating reach 113°, and also can impart a self-repairing function to the coating material. For micro scratches caused by the external force, a transesterification reaction will take place at the micro scratches under the action of light-heat energy and accelerator. That is to say, the ester bond formed by carboxyl group and hydroxyl group in the main chain structure of polyester resin may be subjected to a reversible dissociation-esterification reaction, wherein the dynamic ester bond is subjected to a topological rearrangement reaction, resulting in micro-deformations of the coating, thereby realizing the healing and repairing of the micro-cracks, and greatly extending the service life of the coating material. After the powder coatings containing the polymer wax powder according to the present disclosure is cured to form a film, the film has an obvious self-repairing effect on scratches with a scratch strength less than 500 g.

DETAILED DESCRIPTION

The following examples is used to further illustrate the present disclosure, but not to limit the scope of the present disclosure.

Example 1

A method for preparing a polymer wax powder having a self-repairing function, comprising the following steps:

1) mixing components a polyethylene wax, an allyl bisphenol A diglycidyl ether epoxy resin, a hydroxyalkylamide, a silane coupling agent, a carboxyl-terminated saturated polyester and an accelerator were mixed, and the parts by weight of each component were as follows:

55 parts of the polyethylene wax,
15 parts of allyl bisphenol A diglycidyl ether epoxy resin,
1.5 parts of the hydroxyalkylamide,
2 parts of allyltrimethoxysilane,
1 part of allyltriethoxysilane,
0.5 part of γ-methacryloxypropyl trimethoxysilane,
20 parts of the carboxyl-terminated saturated polyester,
2 parts of nano-zinc oxide,
2 parts of tetraisobutyl orthotitanate, and
1 part of bis(pentane-2,4-dionato-O,O')zinc;

2) melt extruding the above components were added into a twin screw extruder, and heated to 110° C. and extruded, and then cooled and tableted, obtaining a composite wax sheet;

3) micronizing the composite wax sheet obtained in step 2) was micronized, to obtain a wax micropowder with an average particle size of 50 μm;

4) cross-linking by an electron irradiation the micronized composite wax was strengthened by an electron irradiation, with a device radiation energy of 5 MV, a power of 100 kW, and a radiation residence time of 1500 s, obtaining a polymer wax powder having a self-repairing function.

The above polymer wax powder having a self-repairing function was added into an epoxy polyester type powder coating, and the resulting mixture comprised the following components:

108 kg of E-12 bisphenol A diglycidyl ether epoxy resin (Anhui Shanfu 604U),
160 kg of polyester (Anhui Shenjian SJSA),
5 kg of a leveling agent,
4 kg of 701B,
2 kg of benzoin,
40 kg of the wax powder having a self-repairing function,
130.7 kg of barium sulfate,
40 kg of titanium dioxide, and
0.3 kg of carbon black, and the resulting mixture was cured at 200° C. for 10 min, the obtained powder coating was scratched by a 500 g scratch tester in advance, and after being repaired at 70° C. for 30 min, the scratch was not obvious visually, and after being repaired at 30° C. for 480 h, the scratch was not visible, indicating that the coating has a self-repairing function for scratches.

Example 2

The preparation method of this example was the same as that of Example 1, except that the parts by weight of each component were as follows:

75 parts of the polyethylene wax,
20 parts of allyl bisphenol A diglycidyl ether epoxy resin,
2 parts of the hydroxyalkylamide,
2 parts of allyltrimethoxysilane,
1 part of vinyl triethoxy silane,
0.5 part of γ-methacryloxypropyl trimethoxysilane,
15 parts of the carboxyl-terminated saturated polyester,
2 parts of nano-zinc oxide,
1 parts of tetraisobutyl orthotitanate, and
1 part of bis(pentane-2,4-dionato-O,O')zinc.

The above polymer wax powder having a self-repairing function was added into an epoxy polyester type powder coating, and the resulting mixture comprised the following components:

108 kg of E-12 bisphenol A diglycidyl ether epoxy resin (Anhui Shanfu 604U),
160 kg of polyester (New Sino-French Polymer Materials Co., Ltd 6055),
5 kg of a leveling agent,
4 kg of 701B,
2 kg of benzoin,
40 kg of the wax powder having a self-repairing function,
130.7 kg of barium sulfate,
40 kg of titanium dioxide, and
0.3 kg of carbon black, and the resulting mixture was cured at 180° C. for 20 min, the obtained powder coating was scratched by a 450 g scratch tester in advance, and after being repaired at 80° C. for 30 min, the scratch was not obvious visually, and after being repaired at 30° C. for 480 h, the scratch was not visible, indicating that the coating has a self-repairing function for scratches.

Example 3

The preparation method of this example was the same as that of Example 1, except that the parts by weight of each component were as follows:

60 parts of the polyethylene wax,
10 parts of the allyl bisphenol A diglycidyl ether epoxy resin,
1 parts of the hydroxyalkylamide,
1 parts of allyltriethoxysilane,
1 part of vinyl triethoxy silane,
0.5 part of γ-methacryloxypropyl trimethoxysilane,
10 parts of the carboxyl-terminated saturated polyester,
1 part of nano-zinc oxide, and
1 part of tetraisobutyl orthotitanate.

The above polymer wax powder having a self-repairing function was added into a epoxy polyester type powder coating, and the resulting mixture comprised the following components:

108 kg of E-12 bisphenol A diglycidyl ether epoxy resin (Anhui Shanfu 604U),
108 kg of polyester (New Sino-French Polymer Materials Co., Ltd 5086),
4 kg of a leveling agent,
3.2 kg of 701B,
1.7 kg of benzoin,
40 kg of the wax powder having a self-repairing function,
105 kg of barium sulfate,
33 kg of titanium dioxide, and
0.25 kg of carbon black,
and the resulting mixture was cured at 180° C. for 20 min, the obtained powder coating was scratched by a 400 g scratch tester in advance, and after being repaired at 90° C. for 30 min, the scratch was not obvious visually, and after being repaired at 30° C. for 480 h, the scratch was not visible, indicating that the coating has a self-repairing function for scratches.

The invention claimed is:

1. A polymer wax powder having a self-repairing function, being prepared from the following components in parts by weight:
   55-75 parts of a polyethylene wax,
   1-20 parts of an allyl bisphenol A diglycidyl ether epoxy resin,
   0.5-2 parts of a hydroxyalkylamide,
   0.5-5 parts of a silane coupling agent,
   5-25 parts of a carboxyl-terminated saturated polyester, and
   0.5-5 parts of an accelerator.

2. A method for preparing the polymer wax powder having a self-repairing function as claimed in claim 1, wherein the method comprises the following steps:
   1) mixing components
      mixing a polyethylene wax, an allyl bisphenol A diglycidyl ether epoxy resin, a hydroxyalkylamide, a silane coupling agent, a carboxyl-terminated saturated polyester and an accelerator in parts by weight;
   2) melt extruding
      adding the above components into a twin screw extruder, heating the mixture to 70° C.-130° C. and extruding the same, and then cooling and tabletting the obtained extrudate, to obtain a composite wax sheet;
   3) micronizing
      micronizing the composite wax sheet obtained in step 2) to obtain a wax micropowder with an average particle size of 1 μm-75 μm; and
   4) cross-linking by an electron irradiation
      strengthening the micronized composite wax by an electron irradiation with a material irradiation dose of 300-1000 kGy, a device radiation energy of 1.5-5 MV, a power of 60-150 kW, and a radiation residence time of 60-1800 s, to obtain a polymer wax powder having a self-repairing function.

3. The method for preparing the polymer wax powder having a self-repairing function as claimed in claim 2, wherein the allyl bisphenol A diglycidyl ether epoxy resin is 4,4'-diallylbisphenol A diglycidyl ether epoxy resin with an epoxy equivalent of 210-333 g/mol.

4. The method for preparing the polymer wax powder having a self-repairing function as claimed in claim 2, wherein the silane coupling agent is at least one selected from the group consisting of allyltrimethoxysilane, allyltriethoxysilane, γ-methacryloxypropyl trimethoxysilane and vinyl triethoxy silane.

5. The method for preparing the polymer wax powder having a self-repairing function as claimed in claim 2, wherein the carboxyl-terminated saturated polyester has an acid value of 12-90 mg KOH/g.

6. The method for preparing the polymer wax powder having a self-repairing function as claimed in claim 2, wherein the accelerator is at least one selected from the group consisting of nano-zinc oxide, tetraisobutyl orthotitanate and bis(pentane-2,4-dionato-O,O')zinc.

* * * * *